(12) United States Patent
Rengaswamy et al.

(10) Patent No.: US 12,539,814 B2
(45) Date of Patent: Feb. 3, 2026

(54) METHOD AND SIDE-VIEW MIRROR SYSTEM OF VEHICLE FOR MONITORING AMBIENT PARAMETERS DURING VEHICLE MOBILITY

(71) Applicant: Indian Institute of Technology Madras (IIT Madras), Chennai (IN)

(72) Inventors: Raghunathan Rengaswamy, Chennai (IN); Sathish Swaminathan, Chennai (IN); Sumeer Subramanian, Chennai (IN)

(73) Assignee: INDIAN INSTITUTE OF TECHNOLOGY MADRAS (IIT MADRAS), Chennai (IN)

( * ) Notice: Subject to any disclaimer, the term of this patent is extended or adjusted under 35 U.S.C. 154(b) by 19 days.

(21) Appl. No.: 18/729,772

(22) PCT Filed: Jan. 17, 2023

(86) PCT No.: PCT/IN2023/050044
§ 371 (c)(1),
(2) Date: Jul. 17, 2024

(87) PCT Pub. No.: WO2023/139600
PCT Pub. Date: Jul. 27, 2023

(65) Prior Publication Data
US 2025/0162504 A1    May 22, 2025

(51) Int. Cl.
*B60Q 9/00*      (2006.01)
*B60R 1/12*      (2006.01)
(Continued)

(52) U.S. Cl.
CPC ............ *B60R 1/12* (2013.01); *B60R 16/0237* (2013.01); *B60W 40/02* (2013.01);
(Continued)

(58) Field of Classification Search
CPC .................. B60R 1/12; B60R 16/0237; B60R 2001/1223; B60R 2001/123; B60W 40/02; B60W 2556/65
See application file for complete search history.

(56) References Cited

U.S. PATENT DOCUMENTS 5,383,054 A * 1/1995 Chang .................... B60R 1/0602
359/507
5,486,952 A * 1/1996 Nagao ..................... B60R 1/088
359/884

(Continued)

*Primary Examiner* — Quang Pham (57) ABSTRACT

Embodiments herein provide a side-view mirror system (1000) of a vehicle (10a) for monitoring plurality of ambient parameters during vehicle (10a) mobility. The side-view mirror system (1000) includes a first set of sensors (182a-188a) in a right side-view mirror (100a) and a second set of sensors (182b-188b) in a left side-view mirror (100b). A first sensor (182a) and a second sensor (182b) configured to identify first set of ambient parameters. An data management controller (120) configured to extract a second set of ambient parameters from the first set of ambient parameters, receive a set of parameters associated with the vehicle (10a), generate a common message comprising the second set of ambient parameters and the set of parameters associated with the vehicle (10a) and send the generated common message to a cloud-server (2000) and a side-view mirror system (1000) of another vehicle (10b) for monitoring.

14 Claims, 5 Drawing Sheets

(51) Int. Cl.
*B60R 16/023* (2006.01)
*B60W 40/02* (2006.01)
*G07C 5/00* (2006.01)

(52) U.S. Cl.
CPC . *B60R 2001/1223* (2013.01); *B60R 2001/123* (2013.01); *B60W 2556/65* (2020.02)

(56) References Cited

U.S. PATENT DOCUMENTS

| | | | | |
|---|---|---|---|---|
| 5,610,772 A * | 3/1997 | Iizuka | | B60R 1/06 |
| | | | | 359/872 |
| 5,669,704 A * | 9/1997 | Pastrick | | B60R 1/1207 |
| | | | | 362/494 |
| 5,675,438 A * | 10/1997 | Nagao | | B60R 1/088 |
| | | | | 359/603 |
| 5,706,144 A * | 1/1998 | Brandin | | B60R 1/02 |
| | | | | 359/877 |
| 5,796,176 A * | 8/1998 | Kramer | | B60R 1/02 |
| | | | | 701/49 |
| 5,959,367 A * | 9/1999 | O'Farrell | | B60R 16/037 |
| | | | | 701/49 |
| 6,154,328 A * | 11/2000 | Welsch | | B60R 1/07 |
| | | | | 359/872 |
| 6,243,024 B1 * | 6/2001 | Yamabuchi | | G08G 1/161 |
| | | | | 361/600 |
| 6,243,205 B1 * | 6/2001 | Kobayashi | | B60R 1/088 |
| | | | | 359/603 |
| 6,267,664 B1 * | 7/2001 | Vandale | | B60S 1/026 |
| | | | | 454/123 |
| 6,290,361 B1 * | 9/2001 | Berzin | | B60S 1/544 |
| | | | | 359/507 |
| 6,397,137 B1 * | 5/2002 | Alpert | | B60R 1/02 |
| | | | | 359/877 |
| 6,698,905 B1 * | 3/2004 | Whitehead | | B60R 1/087 |
| | | | | 359/872 |
| 6,840,637 B2 * | 1/2005 | Wang | | B60R 1/02 |
| | | | | 359/876 |
| 6,859,144 B2 * | 2/2005 | Newman | | B60Q 9/008 |
| | | | | 382/104 |
| 6,932,497 B1 * | 8/2005 | Huang | | B60R 1/1207 |
| | | | | 362/540 |
| 7,009,498 B2 * | 3/2006 | Lang | | B60R 1/12 |
| | | | | 340/425.5 |
| 7,815,348 B2 * | 10/2010 | Pastrick | | B60Q 1/2665 |
| | | | | 362/540 |
| 8,783,924 B1 * | 7/2014 | Zuiderveen | | B60R 1/1207 |
| | | | | 362/348 |
| 9,046,652 B2 * | 6/2015 | Whinnery | | G02B 27/0093 |
| 9,499,110 B2 * | 11/2016 | Takahashi | | B60K 35/60 |
| 10,513,274 B1 * | 12/2019 | Sung | | G05D 1/0088 |
| 10,894,512 B2 * | 1/2021 | Phillips | | B60R 1/006 |
| 11,657,694 B2 * | 5/2023 | Schumacher | | G06V 40/19 |
| | | | | 382/104 |
| 12,233,783 B2 * | 2/2025 | Choi | | B60K 35/60 |
| 2002/0175867 A1 * | 11/2002 | Kodama | | H01Q 1/3266 |
| | | | | 343/711 |
| 2002/0177927 A1 * | 11/2002 | Kodama | | B60R 1/12 |
| | | | | 701/1 |
| 2003/0011887 A1 * | 1/2003 | Sato | | B60R 1/088 |
| | | | | 359/821 |
| 2003/0122059 A1 * | 7/2003 | Su | | B60R 1/088 |
| | | | | 250/214 B |
| 2003/0169160 A1 * | 9/2003 | Rodriguez Barros | | B60Q 1/2665 |
| | | | | 340/426.1 |
| 2006/0238318 A1 * | 10/2006 | Brouwer | | B60R 1/12 |
| | | | | 340/937 |
| 2008/0046150 A1 * | 2/2008 | Breed | | B60R 21/0134 |
| | | | | 701/45 |
| 2009/0316272 A1 * | 12/2009 | Gibbs | | B60R 1/085 |
| | | | | 359/872 |
| 2010/0007961 A1 * | 1/2010 | Kukita | | B60R 1/06 |
| | | | | 359/850 |
| 2011/0260848 A1 * | 10/2011 | Rodriguez Barros | | B60Q 1/324 |
| | | | | 340/438 |
| 2012/0062743 A1 * | 3/2012 | Lynam | | B60R 1/12 |
| | | | | 348/148 |
| 2012/0326888 A1 * | 12/2012 | Lynam | | B60R 1/062 |
| | | | | 340/901 |
| 2013/0051040 A1 * | 2/2013 | Kracker | | B60Q 1/2665 |
| | | | | 362/464 |
| 2013/0176145 A1 * | 7/2013 | Yu | | G08G 1/167 |
| | | | | 340/905 |
| 2013/0293974 A1 * | 11/2013 | Hartmann | | B60R 1/074 |
| | | | | 359/841 |
| 2014/0091915 A1 * | 4/2014 | Rodriguez | | B60R 1/1207 |
| | | | | 340/435 |
| 2015/0084756 A1 * | 3/2015 | Mori | | B60Q 3/51 |
| | | | | 362/23.19 |
| 2015/0097660 A1 * | 4/2015 | Adell | | G08B 5/36 |
| | | | | 340/435 |
| 2016/0016507 A1 * | 1/2016 | Cheng | | B60Q 1/324 |
| | | | | 362/540 |
| 2017/0210282 A1 * | 7/2017 | Rodriguez Barros | | B60Q 1/324 |
| 2017/0364086 A1 * | 12/2017 | Williams | | G01S 7/4813 |
| 2018/0032822 A1 * | 2/2018 | Frank | | B60R 1/12 |
| 2018/0086272 A1 * | 3/2018 | De Wind | | B60R 1/07 |
| 2019/0031105 A1 * | 1/2019 | Kim | | B60R 1/081 |
| 2019/0309563 A1 * | 10/2019 | Salter | | G01V 8/12 |
| 2019/0309564 A1 * | 10/2019 | Mitchell | | B60Q 5/005 |
| 2020/0047672 A1 * | 2/2020 | Nabel | | B60R 1/12 |
| 2020/0241129 A1 * | 7/2020 | Yu | | G01S 13/931 |
| 2021/0025997 A1 * | 1/2021 | Rosenzweig | | G01S 7/4817 |
| 2021/0046976 A1 * | 2/2021 | Ziebart | | G08G 1/168 |
| 2021/0229601 A1 * | 7/2021 | Hu | | B60R 1/072 |
| 2021/0405159 A1 * | 12/2021 | Huang | | G01S 7/4813 |
| 2022/0017016 A1 * | 1/2022 | Slama | | B60R 11/0235 |
| 2022/0203896 A1 * | 6/2022 | Choi | | B60R 1/062 |

* cited by examiner

FIG. 4

METHOD AND SIDE-VIEW MIRROR SYSTEM OF VEHICLE FOR MONITORING AMBIENT PARAMETERS DURING VEHICLE MOBILITY

FIELD OF INVENTION

The embodiments herein relate to monitoring ambient environmental parameters by a vehicle system. More particularly to a method and side-view mirror system of vehicle for monitoring ambient parameters during vehicle mobility by providing the side-view mirror system in a hollow space behind reflecting surface. The present application is based on, and claims priority from Indian Application Number 202241002836 filed on 18 Jan. 2022, and PCT/IN2023/050044 filed on 17 Jan. 2023, the disclosure of which is hereby incorporated by reference herein.

BACKGROUND OF THE INVENTION

Generally, mobile sensing aims at collecting data using mobile devices from various sensors placed in various locations in an environment. With the advent of internet of things (IoT) and miniaturization of sensing mechanisms, the mobile sensing/monitoring is proving to be a robust mechanism for collecting the data from the environment. Though static monitoring is performed conventionally, static monitoring systems suffer from limited area coverage and hence low accuracy of the data collected. Mobile sensing enables collection of data in real time from different areas of a location in a dynamic way. Generally, the mobile sensing is performed by mobile sensors placed on top of the vehicles which move throughout the city.

When compared to the static monitoring, the mobile sensing has larger coverage due to mobility and hence provides diverse data which provides better accuracy. However, conventional mobile monitoring is done using sensing devices having custom form factor that are retrofit on mobile systems such as vehicles. Moreover, fixing the sensing devices on the vehicles would require major modifications to the vehicles for mounting the sensing devices, operating the sensing devices, etc. which affects the mobility and aesthetics of the vehicles. Thus, it is desired to address the above mentioned disadvantages or other shortcomings or at least provide a useful alternative.

OBJECT OF INVENTION

The principal object of the embodiments herein is to provide a method and side-view mirror system of vehicle for monitoring ambient parameters during vehicle mobility. The side-view mirror system is placed in hollow space behind reflecting surface to provide capture ambient parameters while the vehicle traverses across multiple locations. The mobility of the vehicle provides diverse parameters and also increases diverse readings of a specific parameter thereby increasing larger coverage while monitoring ambient parameters. The use of the hollow space ensures that the vehicle aesthetics are not compromised at the same time providing efficient results.

SUMMARY

Accordingly, the embodiments herein provide a side-view mirror system of a vehicle for monitoring plurality of ambient parameters during vehicle mobility. The side-view mirror system includes a first set of sensors placed at a hollow casing of a right side-view mirror of the vehicle behind a right reflective glass and a second set of sensors placed at a hollow casing of a left side-view mirror of the vehicle behind a left reflective glass. At least one first sensor of the first set of sensors and at least one second sensor of the second set of sensors is configured to identify a first set of ambient parameters. The side-view mirror system includes a data management controller connected to a communicator and each of the first set of sensors and the second set of sensors. The data management controller is configured to extract a second set of ambient parameters from the first set of ambient parameters and receive a set of parameters associated with the vehicle by the communicator and generate a common message comprising the extracted second set of ambient parameters and the set of parameters associated with the vehicle. Further, the communicator is configured to send the generated common message to at least one of a cloud-server and a side-view mirror system of another vehicle for monitoring.

In an embodiment, the data management controller is located in one of the right side-view mirror and the left side-view mirror of the vehicle.

In an embodiment, the right side-view mirror includes a right stem to connect the right side-view mirror to the vehicle and the left side-view mirror comprises a left stem to connect the left side-view mirror to the vehicle.

In an embodiment, the stem of the right side-view mirror and the stem of the left side-view mirror are hollow to connect to a power source of the vehicle and communication.

In an embodiment, the right side-view mirror and the left side-view mirror includes openings with louvers to expose the first set of sensors and the second set of sensors to ambient environment and receive the first set of ambient parameters and the second set of ambient parameters. The louvers prevent water and large objects from enter the openings.

In an embodiment, the common message comprises a packet identifier (ID), a device ID identifying the side-view mirror system the generated common message, a timestamp and a real time location of the vehicle at a time when the common message is generated.

In an embodiment, the common message comprises a message type, wherein the message type is one of a High frequency message and a low frequency message.

In an embodiment, the cloud-server is configured to receive a plurality of common messages from the side-view mirror system of a plurality of vehicles and segregate the plurality of common messages into the high frequency message and the low frequency message. The cloud-server is configured to categorize the segregated data based on a device ID identifying the side-view mirror system of the vehicle generating the common message, a timestamp and a real time location of the vehicle at a time when the common message is generated; and generate a plurality of spatio-temporal maps corresponding to each of the plurality of ambient parameters in the plurality of common messages.

In an embodiment, the common message is generated with a predetermined size and a predetermined format.

In an embodiment, each of the right side-view mirror and the left side-view mirror includes vents to let air out of the hollow casing.

Accordingly, the embodiments herein provide a method for monitoring plurality of ambient parameters by a side-view mirror system of a vehicle during vehicle mobility. The method includes identifying, by a first set of sensors and a second set of sensors of the side-view mirror system, a first set of ambient parameters. The first set of sensors is placed at a hollow casing of a right side-view mirror of the vehicle behind a right reflective glass and the second set of sensors is placed at a hollow casing of a left side-view mirror of the vehicle behind a left reflective glass. Further, the method includes extracting, by a data management controller of the side-view mirror system, a second set of ambient parameters from the first set of ambient parameters and receiving, by a communicator of the side-view mirror system set of parameters associated with the vehicle. The method also includes generating, by the data management controller, a common message comprising the extracted second set of ambient parameters and the set of parameters associated with the vehicle; and sending, by the communicator, the generated common message to at least one of a cloud-server and a side-view mirror system of another vehicle for monitoring.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the scope thereof, and the embodiments herein include all such modifications.

BRIEF DESCRIPTION OF FIGURES

This invention is illustrated in the accompanying drawings, throughout which like reference letters indicate corresponding parts in the various figures. The embodiments herein will be better understood from the following description with reference to the drawings, in which.

DETAILED DESCRIPTION OF INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hard-wired circuits, or the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the invention. Likewise, the blocks of the embodiments may be physically combined into more complex blocks without departing from the scope of the invention The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, the embodiments herein provide a side-view mirror system of a vehicle for monitoring plurality of ambient parameters during vehicle mobility. The side-view mirror system includes a first set of sensors placed at a hollow casing of a right side-view mirror of the vehicle behind a right reflective glass and a second set of sensors placed at a hollow casing of a left side-view mirror of the vehicle behind a left reflective glass. At least one first sensor of the first set of sensors and at least one second sensor of the second set of sensors is configured to identify a first set of ambient parameters. The side-view mirror system includes an data management controller connected to a communicator and each of the first set of sensors and the second set of sensors. The data management controller is configured to extract a second set of ambient parameters from the first set of ambient parameters and receive a set of parameters associated with the vehicle by the communicator and generate a common message comprising the extracted second set of ambient parameters and the set of parameters associated with the vehicle. Further, the communicator is configured to send the generated common message to at least one of a cloud-server and a side-view mirror system of another vehicle for monitoring.

Accordingly, the embodiments herein provide a method for monitoring plurality of ambient parameters by a side-view mirror system of a vehicle during vehicle mobility. The method includes identifying, by a first set of sensors and a second set of sensors of the side-view mirror system, a first set of ambient parameters. The first set of sensors is placed at a hollow casing of a right side-view mirror of the vehicle behind a right reflective glass and the second set of sensors is placed at a hollow casing of a left side-view mirror of the vehicle behind a left reflective glass. Further, the method includes extracting, by a data management controller of the side-view mirror system, a second set of ambient parameters from the first set of ambient parameters and receiving, by a communicator of the side-view mirror system set of parameters associated with the vehicle. The method also includes generating, by the data management controller, a common message comprising the extracted second set of ambient parameters and the set of parameters associated with the vehicle; and sending, by the communicator, the generated common message to at least one of a cloud-server and a side-view mirror system of another vehicle for monitoring.

Figure 1:
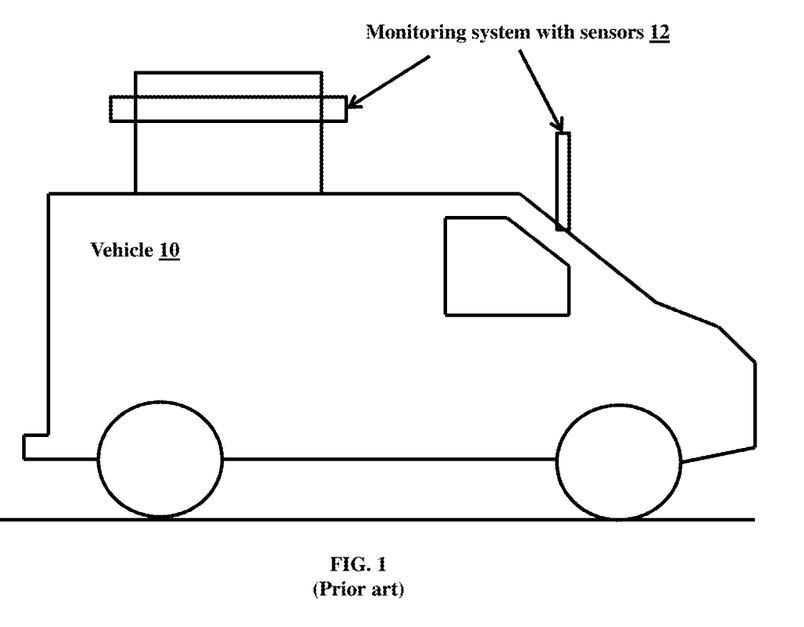
FIG. 1 illustrates a vehicle for monitoring ambient parameters during mobility of the vehicle, according to the prior art.

In the conventional methods and systems, various parameters are collected or monitored using mobility monitoring technique. However, the conventional methods require drastic modification of the vehicles (as shown in FIG. 1) to add sensor systems which are capable of capturing ambient parameters such as air, sunlight, etc. in rela time in ambient environment. This requires modification of the vehicles which degrades the vehicles aesthetically and functionally at the same time incurring a huge cost of modification of the vehicle.

Unlike to the conventional methods and systems, in the proposed method the requires just replacement of existing side-view mirrors of the vehicles with the proposed side-view monitoring system which is a internet of things (IoT) based system capable of monitoring multiple ambient parameters. Also, since the side-view mirrors face towards the ambient environments they are capable of capturing, sensing and monitoring the ambient parameters in real-time without any extra modification to the vehicle.

Unlike to the conventional methods and systems, the proposed side-view mirror system is also capable of communicating and transmitting/receiving data with a cloud server. The cloud server receives data packets comprising ambient parameters from multiple side view mirror systems and hence is capable of generating highly accurate spatio-temporal maps using the multiple ambient parameters. Referring now to the drawings, and more particularly to FIGS. 1 through 4, where similar reference characters denote corresponding features consistently throughout the figures, there are shown preferred embodiments.

FIG. 1 illustrates a vehicle (10a) for monitoring ambient parameters during mobility of the vehicle (10a), according to the prior art. Referring to the FIG. 1, a conventional ambient parameters monitoring system (12) which includes multiple sensors and attached to the vehicle is provided. Here, the monitoring system (12) stands out protruding from a body of the vehicle (10). Also, attaching the monitoring system (12) to the vehicle (10) requires modifications to the vehicle (10) which aesthetically degrades the vehicle (10). Further, due to the large amount of modifications required all or majority of the vehicles (10) may not be able to perform the monitoring of the ambient parameters. As a result of the modifications and extra attachment of the monitoring system (12) the entire process of monitoring the ambient parameters becomes expensive and clumsy.

Figure 2A:
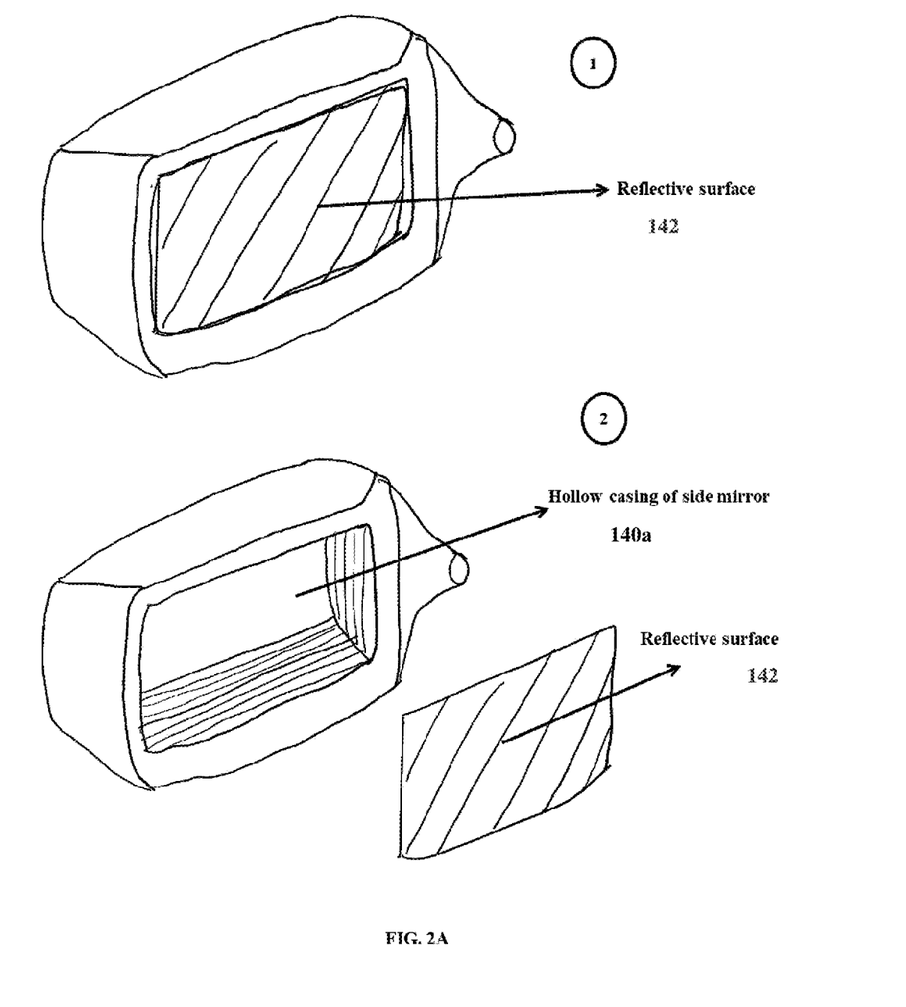
FIG. 2A illustrates a schematic of a side-view mirror of the vehicle, according to an embodiment as disclosed herein.

FIG. 2A illustrates a schematic of a side-view mirror of the vehicle (10), according to an embodiment as disclosed herein. Side-view mirrors are a standard installation in present in the vehicles (10). At 1, the side-view mirror which is provided as an accessory and fitted with the vehicle (10) to help driver of the vehicle (10) to see areas behind and besides the vehicle (10) which may be outside a peripheral vision of the driver, is provided. Also, the side-view mirror is exposed to the ambient environment which exposes the side-view mirror to ambient parameters of the environment such as air, rain water, sunlight, particulate matter, noise, etc. However, casings of the side-view mirror are hollow with a reflective surface (142) on one side and the hollow space is unutilized, as shown in 2 of the FIG. 2A.

Figure 2B:
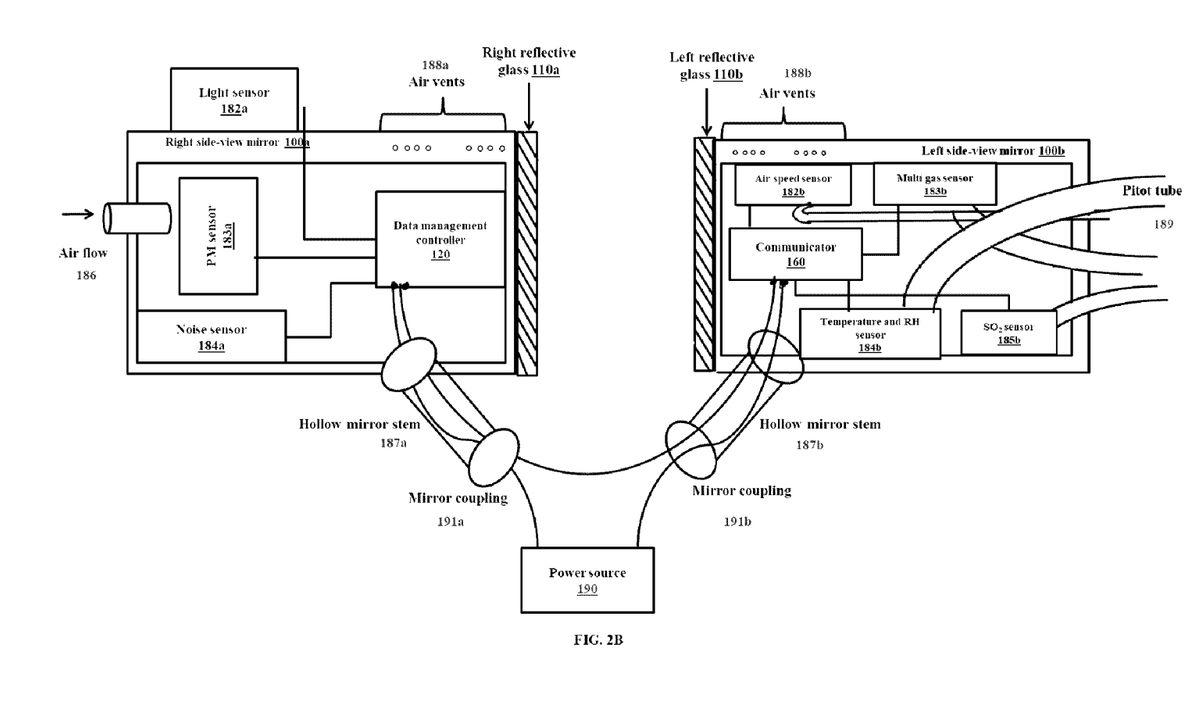
FIG. 2B is a block diagram of a side-view mirror system of the vehicle for monitoring plurality of ambient parameters during vehicle mobility, according to an embodiment as disclosed herein.

FIG. 2B is a block diagram of a side-view mirror system (1000) of the vehicle (10a) for monitoring plurality of ambient parameters during vehicle mobility, according to an embodiment as disclosed herein. Referring to the FIG. 2B in conjunction with the FIG. 2A, the side-view mirror system (1000) is provided as a replacement to the conventional side-view mirrors to serve dual purpose of sensing the ambient parameters as well as fulfill the actual intended use of the side-view mirrors. The side-view mirror system (100) is provided as internet of things (IoT) object with sensing and telemetry capabilities for sensing applications with mobility of the vehicle (10) providing better efficiency. Here, the hollow casing of the side-view mirror system (1000) is utilized to install various components of the side-view mirror system (1000). The side-view mirrors comprising an air flow vents to let air out of the hollow casing. In addition to the sensors themselves, the devices will have custom designed channels that would direct the flow of air to the respective sensor (example, pitot tube in the FIG. 2B). The air vent (188a) comprising grilled air vents (188a) built to each of the right side-view mirror (100a) and the left side-view mirror (100b) to allow the air to escape.

The side-view mirror system (1000) includes a first set of sensors (182a-188a) placed at a hollow casing (140a) of a right side-view mirror (100a) of the vehicle (10a) behind a right reflective glass (110a). The sensors may be PM sensor (183a), noise sensor (184a), light sensor (182a), air speed sensor (182b), multi gas sensor (183b), temperature and RH sensor (184b), $SO_2$ sensor (185b). The Particulate Matter (PM) Sensors (183a) monitor the function of the Diesel Particulate Filter (DPF) to detect excessive PM emissions. The noise sensor (184a) module on the principle of capacitance measure noise by sensing the variation in the sound pressure. The sound pressure change is detected by the capacitor plate of the sensor module. The change in the capacitance of the sensor generates an output signal that is proportional to the sound pressure. The light sensors (182a) are a type of photo-detector (also called photo-sensors) that detect light. Different types of light sensors can be used to measure luminance, respond to changes in the amount of light received, or convert light to electricity. The airspeed sensor (182b) measures the speed of a vehicle relative to the surrounding air. A multi gas sensor (183b) is a portable device designed to detect multiple gases simultaneously. The air temperature and relative humidity sensors (184b) typically consist of two separate sensors packaged in the same housing. Often relative humidity is measured with a capacitive RH sensor, while air temperature is measured by a PRT. The $SO_2$ (185b) sensor works on the electrochemical principle. Electrochemical sensors are very sensitive to $SO_2$ gas changes, which makes them an ideal choice for indicative air quality monitoring for outdoor applications. The hollow mirror stem (187a, 187b) is connected to the data management controller (120) and the mirror coupling (191a, 191b) to the power house (190). The side-view mirror system (100) also includes a second set of sensors (182b-188b) placed at a hollow casing (140b) of a left side-view mirror (100b) of the vehicle (10a) behind a left reflective glass (110b). A first sensor (182a) of the first set of sensors (182a-188a) and a second sensor (182b) of the second set of sensors (182b-188b) is configured to identify a first set of ambient parameters. The first set of sensors (182a-188a) and the second set of sensors (182b-188b) may include for example but not limited to, sensors for measuring various air quality parameters such as particulate matter, obnoxious gas concentrations etc.; sensors for measuring relative wind speed using the pitot tube; sensors for measuring ambient light, ultraviolet and infrared intensity; inertial measurement unit (Comprising mems accelerometer and gyroscope), sensors for temperature and humidity measurement, sensors for measuring sound intensity, camera, sensors for real time location (GPS), a multi gas sensor, a water sensor, air speed sensor, noise sensor, etc. Therefore, the first set of ambient parameters is raw data and cannot be used in original form. The side-view mirror system (1000) includes a right stem to connect the right side-view mirror (100a) to the vehicle (10a) and the left side-view mirror (100b) includes a left stem to connect the left side-view mirror (100b) to the vehicle (10a).

The right side-view mirror (100a) and the left side-view mirror (100b) includes openings with louvers to expose the first set of sensors (182a-188a) and the second set of sensors (182b-188b) to ambient environment and receive the first set of ambient parameters. The openings are strategically placed along with the louvers to allow the sensors to get exposed to the ambient environment. The louvers are designed to prevent rain water and large foreign objects to enter the openings designated for the sensor. In addition to the sensors themselves, the devices will have custom designed channels that would direct the flow of air to the respective sensor (example, pitot tube in the FIG. 2B). There would also be grilled air vents (188a) built to each of the right side-view mirror (100a) and the left side-view mirror (100b) to allow the air to escape.

The stem of the right side-view mirror (100a) and the stem of the left side-view mirror (100b) are hollow to connect to a power source (190) of the vehicle (10a) and communication. The power source (190) is for example but not limited to a battery of the vehicle (10a). Further, each of the right side-view mirror (100a) and the left side-view mirror (100b) includes air vents (188a) to let air out of the hollow casing.

Further, the side-view mirror system (1000) includes a data management controller (120) located in one of the right side-view mirror (100a) and the left side-view mirror (100b) of the vehicle (10b). The data management controller (120) is connected to the first set of sensors (182a-188a) and the second set of sensors (182b-188b) and is configured to extract a second set of ambient parameters from the first set of ambient parameters. The data management controller (120) acquires raw data from the first set of sensors (182a-188a) and the second set of sensors (182b-188b) through standard communication protocols as defined for each sensor by their respective manufacturers. The first set of ambient parameters is processed and then the second set of ambient parameters is extracted from the processed first set of ambient parameters.

Further, the data management controller (120) is also configured to receive a set of parameters associated with the vehicle (10a) such as for example, vehicle ignition state, fuel level, engine performance metrics, internal temperature (in cases of closed vehicles), vehicle battery voltage, etc. The communicator (160) communicates with an onboard vehicle computer (in cases it exists) in order to collect the set of parameters associated with the vehicle (10a). The communicator (160) uses the same protocol as used by the onboard vehicle computer (in cases it exists). The communicator (160) is also capable of extracting information from the vehicle's Battery Management System (BMS) (in cases it exists).

The data management controller (120) is then configured to generate a common message with a predetermined size and a predetermined format and the common message includes the extracted second set of ambient parameters and the set of parameters associated with the vehicle (10b). The common message includes a packet identifier (ID), a device ID identifying the side-view mirror system (1000) the generated common message, a timestamp and a real time location of the vehicle (10a) at a time when the common message is generated. Also, the common message includes a message type, wherein the message type is one of a High frequency message and a low frequency message. Generally, sending a common message which includes parameters with different SI units and value system is not feasible. However, in the proposed method the data management controller (120) generates the common message by taking into consideration the different SI units and value system without altering the actual value in a predefined format.

The data management controller (120) may include one or a plurality of processors, may be a general purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU). The data management controller (120) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductors.

The side-view mirror system (1000) includes a communicator (160) which is a telemetry device configured to send the generated common message to at least one of a cloud-server (2000) and a side-view mirror system (1000) of another vehicle (10b) for monitoring. The cloud-server (2000) is configured to receive a plurality of common messages from the side-view mirror system (1000) of a plurality of vehicles (10a-N) and segregate the plurality of common messages into the high frequency message and the low frequency message. Further, the cloud-server (2000) is configured to categorize the segregated data based on a device ID identifying the side-view mirror system (1000) of the vehicle (10a) generating the common message, a timestamp and a real time location of the vehicle (10a) at a time when the common message is generated and generate a plurality of spatio-temporal maps corresponding to each of the plurality of ambient parameters in the plurality of common messages. The communicator (160) includes an electronic circuit specific to a standard that enables wired or wireless communication. The communicator (160) is configured to communicate internally between internal hardware components of the side-view mirror system (100) and with external devices via one or more networks. Further, the communicator (160) is capable of capability for both short and long-distance communication. The communicator (160) could be in the form of for example but not limited to a Bluetooth providing short distance communication, a radio frequency-based communication such as Zigbee, LoRa, GPRS, GSM for long distance communication and a local Wi-Fi hotspot.

The side-view mirror system (1000) also includes (not shown in FIG. 2B) a human machine interface (192) with a touch sensitive display. The human machine interface (192) is capable of receiving inputs and is made of one of liquid crystal display (LCD), light emitting diode (LED), organic light-emitting diode (OLED), etc. The human machine interface (192) is configured to display the spatio-temporal maps corresponding to each of the plurality of ambient parameters received from the cloud server (2000).

The side-view mirror system (1000) can be easily retrofitted on any vehicle with the use of adapter nuts. One end of the adapter nut is customized for each vehicle manufacturer while the other end is connected to the stem of the side-view mirror system (1000).

The side-view mirror system (1000) can be customized for all kinds of vehicles, including but not limited to two wheelers, three wheelers, four wheelers and all kinds of heavy vehicles. The exterior design of the side-view mirror system (1000) for each vehicle kind would be customized to mimic the standard mirror design for that vehicle kind. The side-view mirror system (1000) would also be equipped with custom adapters for hassle free coupling to the vehicle onto the factory-made mounting fixtures. Further, the side-view mirror system (1000) blend in with the vehicle (10a) and do not require structural modifications to the vehicle (10a).

Although the FIG. 2B shows various components of the side-view mirror system (1000) but it is to be understood that other embodiments are not limited thereon. In other embodiments, the side-view mirror system (1000) may include less or more number of components. Further, the labels or names of the components are used only for illustrative purpose and does not limit the scope of the invention. One or more components can be combined together to perform same or substantially similar function.

Figure 3:
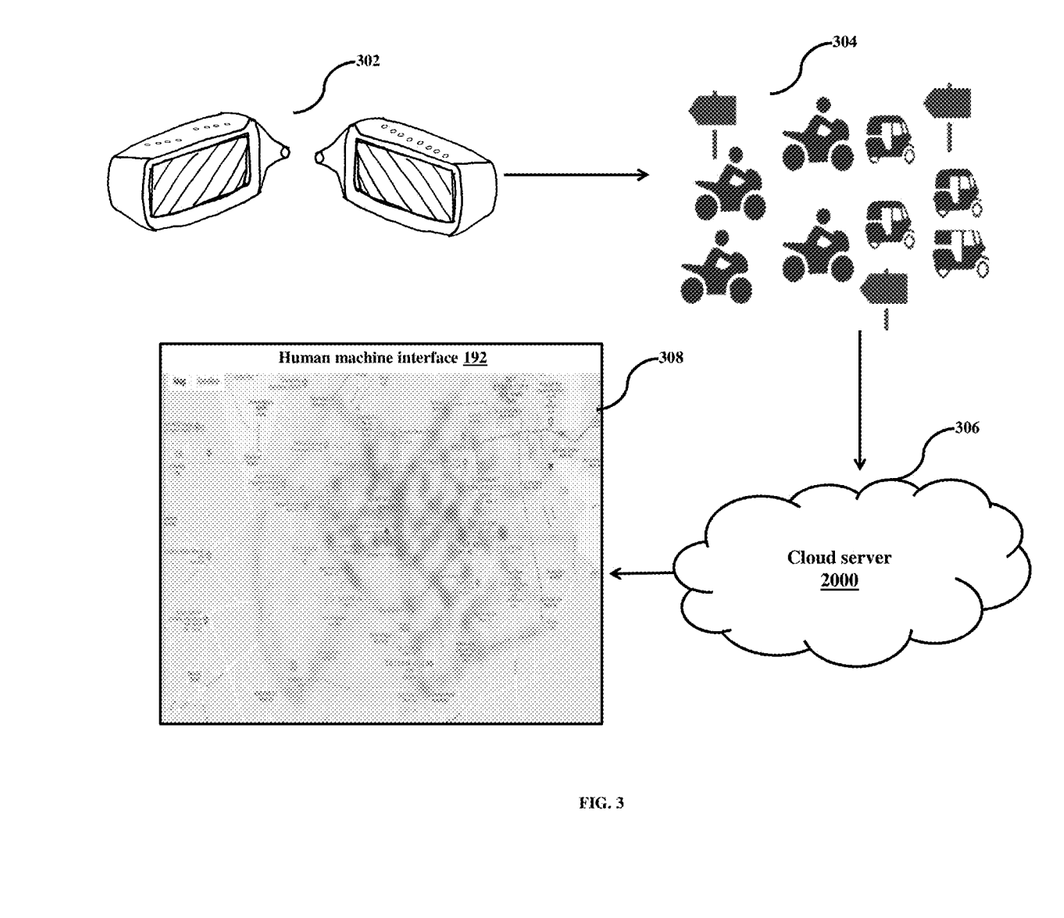
FIG. 3 is an example illustrating the step-by-step procedure for providing the spatio-temporal maps on a human machine interface of the vehicle, according to an embodiment as disclosed herein.

FIG. 3 is an example illustrating the step-by-step procedure for providing the spatio-temporal maps on the human machine interface (192) of the vehicle (10a), according to an embodiment as disclosed herein.

Referring to the FIG. 3, at step 302 the data Collection and processing is performed at the side-view mirror system (1000). Here, consider that the side-view mirror system (1000) of the vehicle (10a) monitors the plurality of ambient parameters during the mobility of the vehicle (10a). The side-view mirror system (1000) collects the plurality of ambient parameters from the ambient environment through an array of sensors. The side-view mirror system (1000) is designed in a modular fashion that allows for replacement and addition of new sensors. The array of sensors is capable of measuring multiple ambient parameters including, but not limited to ambient air quality, ambient temperature and relative humidity, barometric pressure, rainfall, ambient light intensity, noise etc. The values obtained from the sensors are raw values and needs to be processed in order to convert them into meaningful information. This would involve on board preprocessing of the raw sensor data. In addition to ambient parameters measurements, the side-view mirror system (1000) would also be capable of collecting vehicle specific information that can be obtained either through communication with vehicle on board diagnostic computer (if the vehicle has one) or through other sensors.

Further, the side-view mirror system (1000) generates the data packet with the processes sensor data and the vehicle specific information. For ease of use, the data would be stored as JSON data packets. Each data packet is tagged with a unique packet ID, a device ID that identifies the device from which the packet was generated, timestamp and the real time location of the vehicle at the time when the packet was generated. The data packets would be of two kinds i.e., high frequency data and low frequency data. In this application, the data is considered to be low frequency if the measurands are measured with an interval of more than 1 second per sample. The data is high frequency if the measurands are measured with an interval of less than 1 second per sample.

At step 304, the side-view mirror system (1000) sends the data packets to the cloud server (2000). Similarly, multiple side-view mirror systems (1000a-N) of multiple vehicles (10a-N) will all send the data packets to the cloud server (2000). Therefore, the cloud server (2000) receives diverse data packets with ambient parameters from diverse locations captured due the mobility of multiple vehicles (10a-N). At step 306, the cloud server (2000) segregates the data packets into high frequency and low frequency data packets and stores the data packets separately based on the data packet type. Further, the cloud server (2000) also stores and categorizes the data packets by device ID and the time at which each of the data packets arrived at the cloud server (2000). Therefore, the data packets received from multiple side-view mirror systems (1000) are stored in the same cloud server (2000). As a result, the data packets from ensures that the data from multiple vehicles (10a-N) are processed together in an algorithm at the cloud server (2000).

Further, the cloud server (2000) on receiving the data packets from multiple side-view mirror systems (1000), the cloud server (2000) uses specific algorithms to combine the data from different side-view mirror systems (1000) and across different times to come up with a global information pool. Rather than evaluating data from each of the side-view mirror systems (1000), data from multiple side-view mirror systems (1000) are assimilated together. Assimilation of the data involves running complex spatio-temporal algorithms to combine data from multiple side-view mirror systems (1000) to obtain the result. This is one of the key advantages of monitoring ambient parameters with side-view mirror systems (1000) of vehicles which are mobile. Also, the side-view mirror systems (1000) of mobile vehicles provide data from non-static sources, and thus achieve greater spatial coverage with a less number of sensing devices. Aggregating data from multiple side-view mirror systems (1000) mounted on different vehicles allows greater spatial coverage of each measurement.

The algorithm at the cloud server (2000) combines data acquired by multiple side-view mirror systems (1000) to create a near real time spatio-temporal map of the multiple ambient parameters that are measured by the side-view mirror systems (1000). Furthermore, aggregation and processing of the side-view mirror system (1000) data on the cloud server (2000) allows the measurements from the sensors in the side-view mirror systems (1000) be corrected using other sources which are may or may not be available in generating multi parameter high resolution, spatio-temporal maps.

At step 308, the cloud server (2000) transmits the multiple spatio-temporal map of the multiple ambient parameters to the vehicles (10a-N). The spatio-temporal parameter map obtained using the vehicle mounted side-view mirror system (1000) will show a near real time variation of the ambient parameters with space and time. Depending on the ambient parameters that are collected by the side-view mirror system (1000), the spatio-temporal maps can provide all kinds of information. Some possible high resolution, spatio-temporal maps that can be obtained using the data collected from the side-view mirror system (1000) include but are not limited to:

1. Real time spatio-temporal air quality map
2. Noise intensity map
3. Road condition map
4. Ambient light, UV and IR intensity map
5. Ambient temperature and relative humidity map In order to collect such rich spatio-temporal data, mobile monitoring is arguably the most effective approach. Thus, the side-view mirror system (1000) gives a viable option to collect multi-parameter data without having to modify the vehicles.

Figure 4:
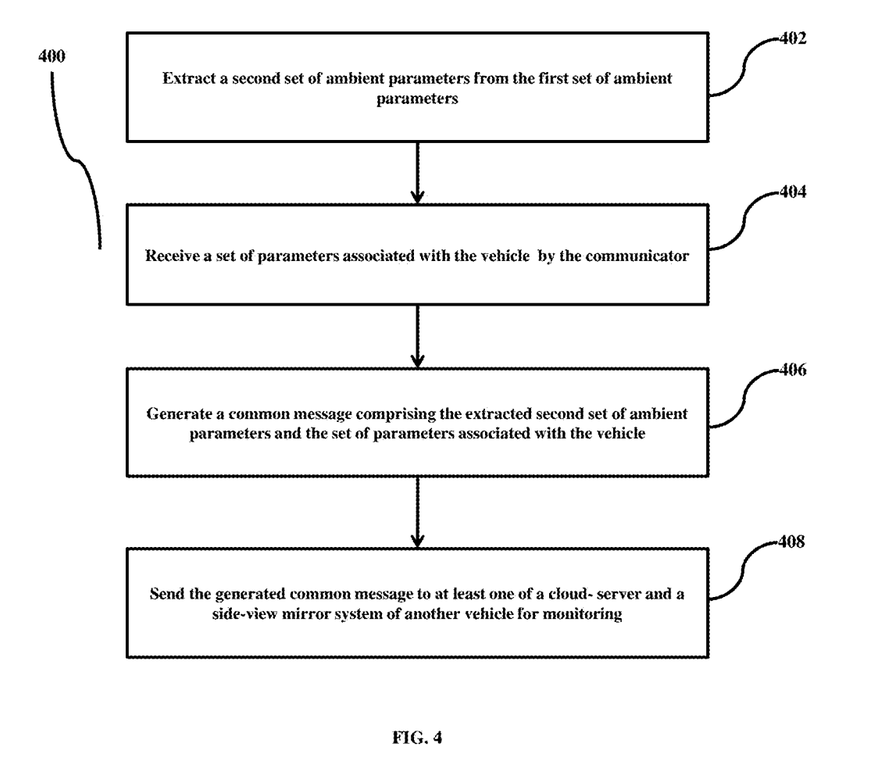
FIG. 4 is a flow chart illustrating a step-by step procedure of monitoring the plurality of ambient parameters during vehicle mobility by the side-view mirror system of the vehicle, according to an embodiment as disclosed herein.

FIG. 4 is a flow chart (400) illustrating a step-by step procedure of monitoring the plurality of ambient parameters during vehicle (10*a*) mobility by the side-view mirror system (1000) of a vehicle (10*a*), according to an embodiment as disclosed herein.

Referring to the FIG. 4, at step 402, the side-view mirror system (1000) extracts the second set of ambient parameters from the first set of ambient parameters. For example, in the side-view mirror system (1000) illustrated in the FIG. 2B, the data management controller (120) is configured to extract the second set of ambient parameters from the first set of ambient parameters.

At step 404, the side-view mirror system (1000) receives the set of parameters associated with the vehicle (10*a*). For example, in the side-view mirror system (1000) illustrated in the FIG. 2B, the communicator (160) is configured to receive the set of parameters associated with the vehicle (10*a*).

At step 406, the side-view mirror system (1000) generates the common message comprising the extracted second set of ambient parameters and the set of parameters associated with the vehicle (10*a*). For example, in the side-view mirror system (1000) illustrated in the FIG. 2B, the data management controller (120) is configured to generate the common message comprising the extracted second set of ambient parameters and the set of parameters associated with the vehicle (10*a*).

At step 408, the side-view mirror system (1000) sends the generated common message to at least one of the cloud-server (2000) and the side-view mirror system of another vehicle (10*b*) for monitoring. For example, in the side-view mirror system (1000) illustrated in the FIG. 2B, the communicator (160) is configured to send the generated common message to at least one of the cloud-server (2000) and the side-view mirror system of another vehicle (10*b*) for monitoring.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the invention.

The foregoing description of the specific embodiments will so fully reveal the general nature of the embodiments herein that others can, by applying current knowledge, readily modify or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

We claim:

1. A side-view mirror system of a vehicle for monitoring a plurality of ambient parameters during vehicle mobility, wherein the side-view mirror system comprises:
a first set of sensors placed at a hollow casing of a right side-view mirror of the vehicle behind a right reflective glass;
a second set of sensors placed at a hollow casing of a left side-view mirror of the vehicle behind a left reflective glass,
wherein the right side-view mirror and the left side-view mirror comprise openings with louvers to expose the first set of sensors and the second set of sensors to ambient environment and receive the first set of ambient parameters and the second set of ambient parameters, wherein the louvers prevent water and large objects from enter the openings,
wherein at least one first sensor of the first set of sensors and at least one second sensor of the second set of sensors is configured to identify a first set of ambient parameters;
a data management controller is located in one of the right side-view mirror and the left side-view mirror of the vehicle and connected to a communicator, located in the other one of the right side-view mirror and the left side-view mirror of the vehicle, and each of the first set of sensors and the second set of sensors, and configured to:
extract a second set of ambient parameters from the first set of ambient parameters,
receive a set of parameters associated with the ambient and predominately external to the vehicle by the communicator,
generate a common message comprising the extracted second set of ambient parameters and the set of parameters associated with the vehicle,
send, by the communicator, the common message to at least one of a cloud-server and a side-view mirror system of another vehicle for the monitoring, wherein the common message further comprises a packet identifier (ID), a device ID identifying the side-view mirror system of the vehicle generating the common message, a timestamp and a real time location of the vehicle at a time when the common message is generated.

2. The side-view mirror system as claimed in claim 1, wherein the right side-view mirror comprises a right stem to connect the right side-view mirror to the vehicle and the left side-view mirror comprises a left stem to connect the left side-view mirror to the vehicle.

3. The side-view mirror system as claimed in claim 2, wherein the right stem and the left stem are hollow to connect to a power source (190) of the vehicle and communication.

4. The side-view mirror system as claimed in claim 1, wherein the common message further comprises a message type, wherein the message type is one of a high frequency message and a low frequency message.

5. The side-view mirror system as claimed in claim 4, comprises the cloud-server configured to:
receive a plurality of common messages from side-view mirror systems of a plurality of vehicles;
segregate the plurality of common messages into the high frequency message and the low frequency message;
categorize, the segregated common messages based on a device ID identifying the side-view mirror system of the vehicle generating the common message, a timestamp and a real time location of the vehicle at a time when the common message is generated; and generate a plurality of spatio-temporal maps corresponding to each of plurality of ambient parameters in the plurality of common messages.

6. The side-view mirror system as claimed in claim 1, wherein the common message is generated with a predetermined size and a predetermined format.

7. The side-view mirror system as claimed in claim 1, wherein each of the right side-view mirror and the left side-view mirror comprises vents to let air out of the hollow casing.

8. A method for monitoring plurality of ambient parameters by a side-view mirror system of a vehicle during vehicle mobility, wherein the method comprises:

identifying, by a first set of sensors and a second set of sensors of the side-view mirror system (1000), a first set of ambient parameters, wherein the first set of sensors is placed at a hollow casing of a right side-view mirror of the vehicle behind a right reflective glass and wherein the second set of sensors is placed at a hollow casing of a left side-view mirror of the vehicle behind a left reflective glass, wherein the right side-view mirror and the left side-view mirror comprise openings with louvers to expose the first set of sensors and the second set of sensors to ambient environment and receive the first set of ambient parameters and the second set of ambient parameters, wherein the louvers prevent water and large objects from enter the openings;

extracting, by a data management controller located in one of the right side-view mirror and the left side-view mirror of the vehicle of the side-view mirror system (1000), a second set of ambient parameters from the first set of ambient parameters;

receiving, by a communicator, located in the other one of the right side-view mirror and the left side-view mirror of the side-view mirror system (1000), a set of parameters associated with the ambient and predominately external to the vehicle;

generating, by the data management controller, a common message comprising the extracted second set of ambient parameters and the set of parameters associated with the vehicle; and sending, by the communicator, the generated common message to at least one of a cloud-server and a side-view mirror system of another vehicle for the monitoring, wherein the common message further comprises a packet identifier (ID), a device ID identifying the side-view mirror system of the vehicle generating the common message, a timestamp and a real time location of the vehicle at a time when the common message is generated.

9. The method as claimed in claim 8, wherein the right side-view mirror comprises a right stem to connect the right side-view mirror to the vehicle and the left side-view mirror comprises a left stem to connect the left side-view mirror to the vehicle.

10. The method as claimed in claim 9, wherein the right stem and the left stem are hollow to connect to a power source (190) of the vehicle and communication.

11. The method as claimed in claim 8, wherein the common message further comprises a message type, wherein the message type is one of a high frequency message and a low frequency message.

12. The method as claimed in claim 11, comprises:

receiving, by the cloud-server, a plurality of common messages the side-view mirror systems of a plurality of vehicles;

segregating, by the cloud-server, the plurality of common messages into the high frequency message and the low frequency message;

categorizing, by the cloud-server, the segregated common messages based on a device ID identifying the side-view mirror system of the vehicle generating the common message, a timestamp and a real time location of the vehicle at a time when the common message is generated; and generating, by the cloud-server, a plurality of spatio-temporal maps corresponding to each of plurality of ambient parameters in the plurality of common messages.

13. The method as claimed in claim 8, wherein the common message is generated with a predetermined size and a predetermined format.

14. The method as claimed in claim 8, wherein each of the right side-view mirror and the left side-view mirror comprises vents to let air out of the hollow casing.

\* \* \* \* \*